United States Patent
Zhang

(10) Patent No.: US 12,487,725 B2
(45) Date of Patent: Dec. 2, 2025

(54) DATA INTERACTION METHOD, APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventor: Tianyu Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/733,619

(22) Filed: Jun. 4, 2024

(65) Prior Publication Data

US 2024/0319840 A1   Sep. 26, 2024

Related U.S. Application Data

(63) Continuation of application No. PCT/CN2022/136560, filed on Dec. 5, 2022.

(30) Foreign Application Priority Data

Dec. 8, 2021 (CN) .......................... 202111491676.1

(51) Int. Cl.
G06F 3/048 (2013.01)
G06F 3/0481 (2022.01)
(Continued)

(52) U.S. Cl.
CPC ........ *G06F 3/0481* (2013.01); *G06F 3/04842* (2013.01); *G06F 3/04845* (2013.01)

(58) Field of Classification Search
CPC ............. G06F 3/0481; G06F 3/04842; G06F 3/04845; G06Q 30/0633; G06Q 30/0641; G06Q 30/0246
See application file for complete search history.

(56) References Cited

U.S. PATENT DOCUMENTS

| 10,535,177 B2* | 1/2020 | Cornell | H04N 21/4788 |
| 2007/0153006 A1* | 7/2007 | Robbins | G06T 13/00 345/474 |

(Continued)

FOREIGN PATENT DOCUMENTS

| CN | 105337843 A | 2/2016 |
| CN | 109120985 A | 1/2019 |

(Continued)

OTHER PUBLICATIONS

International Patent Application No. PCT/CN2022/136560; Int'l Search Report; dated Feb. 22, 2023; 3 pages.

(Continued)

*Primary Examiner* — Mahelet Shiberou
(74) *Attorney, Agent, or Firm* — BakerHostetler

(57) ABSTRACT

A data interaction method, an apparatus, an electronic device, a storage medium, and a program product are provided by embodiments of the present disclosure. The method includes: displaying an object display window of a target work, where a publisher identification of the target work, a target control, and at least two objects are displayed in the object display window, the publisher identification is an identification of a target publisher, and the target publisher is a publisher of the target work; receiving a triggering operation acting on the target control; obtaining, in response to the triggering operation, a target object selected by a user in the object display window, and controlling the target object to move towards a first display position of the publisher identification; and executing, after the target object is moved to the first display position, a feedback event of the target publisher.

17 Claims, 6 Drawing Sheets

(51) Int. Cl.
*G06F 3/04842* (2022.01)
*G06F 3/04845* (2022.01)

(56) References Cited

U.S. PATENT DOCUMENTS

| | | | |
|---|---|---|---|
| 2014/0129942 | A1 | 5/2014 | Rathod |
| 2015/0172599 | A1 | 6/2015 | Caldwell |
| 2016/0036739 | A1* | 2/2016 | Glass ................. H04W 4/12 709/206 |
| 2017/0171599 | A1* | 6/2017 | Peng ..................... G06F 3/14 |
| 2018/0012308 | A1* | 1/2018 | Zha ..................... G06Q 20/02 |
| 2018/0204270 | A1* | 7/2018 | Cheng ................ G06Q 30/0641 |
| 2018/0336543 | A1 | 11/2018 | Van Os et al. |
| 2020/0143447 | A1* | 5/2020 | Wang ................ G06Q 30/0212 |
| 2021/0044640 | A1* | 2/2021 | He ..................... G10L 15/26 |
| 2021/0286510 | A1* | 9/2021 | Tyler .................. G06F 3/04883 |
| 2023/0044173 | A1* | 2/2023 | Efrat .................... G06Q 30/01 |
| 2023/0132073 | A1* | 4/2023 | Zheng .............. H04N 21/25435 705/26.1 |
| 2023/0359337 | A1 | 11/2023 | Gao et al. |
| 2024/0028189 | A1* | 1/2024 | Dong .................... H04N 7/147 |
| 2024/0236227 | A9* | 7/2024 | Chen ................. H04N 21/4583 |
| 2025/0080777 | A1* | 3/2025 | Liu ..................... H04N 21/431 |

FOREIGN PATENT DOCUMENTS

| | | |
|---|---|---|
| CN | 110225388 A | 9/2019 |
| CN | 110337023 A | 10/2019 |
| CN | 110798696 A | 2/2020 |
| CN | 111314204 A | 6/2020 |
| CN | 305868883 S | 6/2020 |
| CN | 111787411 A | 10/2020 |
| CN | 112437338 A | 3/2021 |
| CN | 112764612 A | 5/2021 |
| CN | 113163253 A | 7/2021 |
| CN | 306795116 S | 8/2021 |
| CN | 113344677 A | 9/2021 |
| CN | 114168018 A | 3/2022 |
| JP | 2020-162882 A | 10/2020 |
| JP | 6941245 B1 | 9/2021 |
| JP | 2021-174422 A | 11/2021 |
| WO | WO 2020/175599 A1 | 9/2020 |

OTHER PUBLICATIONS

China Patent Application No. 202111491676.1; Office Action; dated May 22, 2023; 19 pages.
China Patent Application No. 202111491676.1; Second Office Action; dated Aug. 17, 2023; 20 pages.
European Patent Application No. 22903378.2; Extended Search Report; dated Jan. 30, 2025; 8 pages.
Japan Patent Application No. 2024-533332; Notice of Reasons for Refusal; dated Jul. 15, 2025; 6 pages.

* cited by examiner

DATA INTERACTION METHOD, APPARATUS, ELECTRONIC DEVICE, STORAGE MEDIUM, AND PROGRAM PRODUCT

This application is a continuation of International Patent Application No. PCT/CN2022/136560, filed on Dec. 5, 2022, which claims the priority to and benefits of Chinese Patent Application No. 202111491676.1, filed on Dec. 8, 2021. All the aforementioned patent applications are hereby incorporated by reference in their entireties.

TECHNICAL FIELD

Embodiments of the present disclosure relate to the field of computer technology, for example, in particular to a data interaction method, an apparatus, an electronic device, a storage medium, and a program product.

BACKGROUND

At present, users may interact with other users after watching works published by the other users. However, in related technologies, contents displayed by interaction modes and forms of displaying the contents are relatively monotonous, which may cause a poor experience of the user.

SUMMARY

The embodiments of the present disclosure provide a data interaction method, an apparatus, an electronic device, a storage medium, and a program product, so as to enrich the contents displayed during interaction of users and enrich the presentation form of the displayed contents, thereby improving the user experience.

In a first aspect, the embodiments of the present disclosure provide a data interaction method, and the method includes:
  displaying an object display window of a target work, where a publisher identification of the target work, a target control, and at least two objects are displayed in the object display window, the publisher identification is an identification of a target publisher, and the target publisher is a publisher of the target work;
  receiving a triggering operation acting on the target control;
  obtaining, in response to the triggering operation, a target object selected by a user in the object display window, and controlling the target object to move towards a first display position of the publisher identification; and
  executing, after the target object is moved to the first display position, a feedback event of the target publisher.

In a second aspect, the embodiments of the present disclosure further provide a data interaction apparatus, and the apparatus includes:
  a window display module, configured to display an object display window of a target work, where a publisher identification of the target work, a target control, and at least two objects are displayed in the object display window, the publisher identification is an identification of a target publisher, and the target publisher is a publisher of the target work;
  a triggering operation receiving module, configured to receive a triggering operation acting on the target control;
  a moving control module, configured to, in response to the triggering operation, obtain a target object selected by a user in the object display window, and control the target object to move towards a first display position of the publisher identification; and
  a feedback module, configured to, after the target object is moved to the first display position, execute a feedback event of the target publisher.

In a third aspect, the embodiments of the present disclosure further provide an electronic device, and the electronic device includes a processor and a memory; the memory is used to store a program; and the program, when executed by the processor, causes the processor to implement the data interaction method according to any one of the embodiments of the present disclosure.

In a fourth aspect, the embodiments of the present disclosure further provide a computer-readable storage medium; a computer program is stored on the storage medium; and the computer program, when executed by a processor, causes the processor to implement the data interaction method according to any one of the embodiments of the present disclosure.

In a fifth aspect, the embodiments of the present disclosure further provide a computer program product; and the computer program product, when executed by a computer, causes the computer to implement the data interaction method according to any one of the embodiments of the present disclosure.

DETAILED DESCRIPTION

Figure 1:
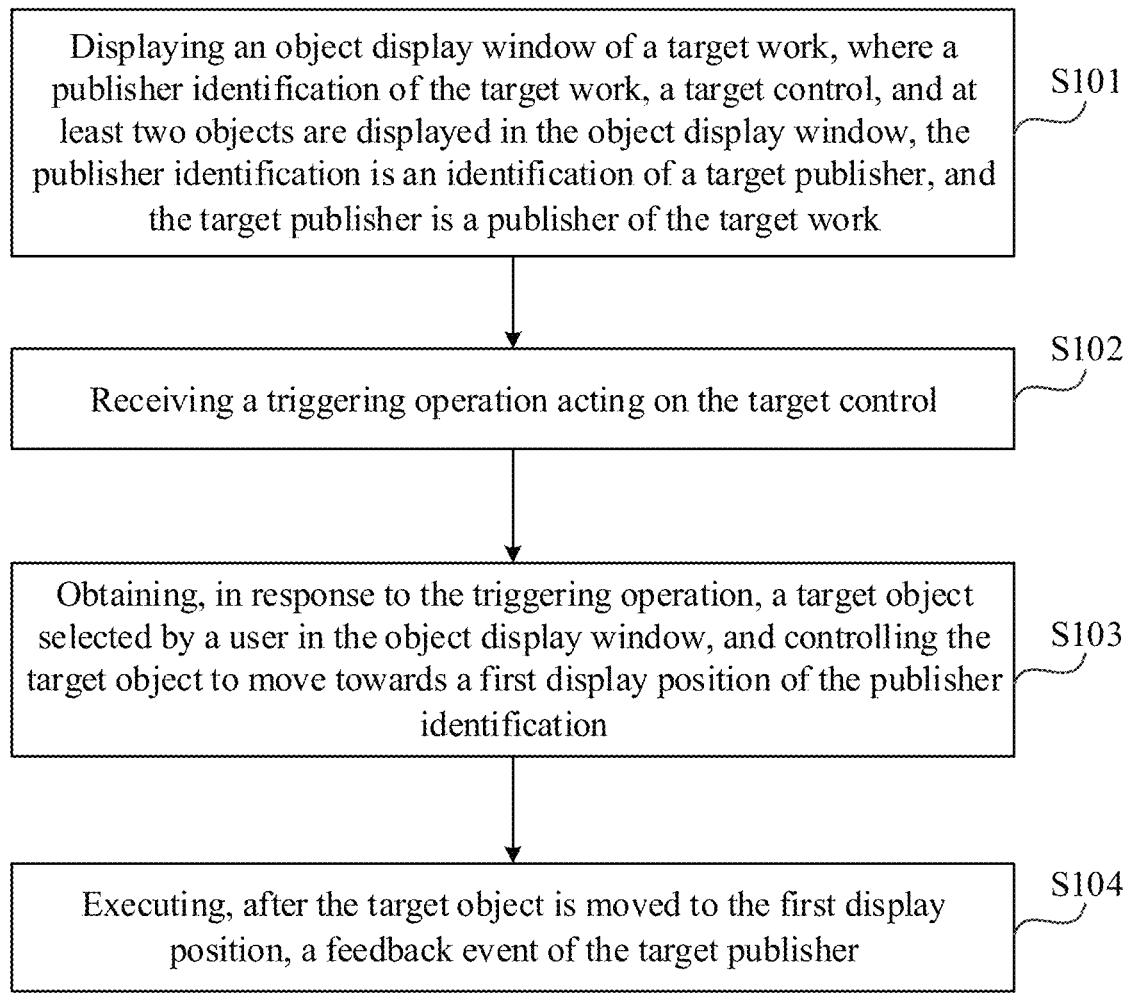
FIG. 1 is a flowchart of a data interaction method provided by an embodiment of the present disclosure.

The embodiments of the present disclosure will be described below with reference to the accompanying drawings. While certain embodiments of the present disclosure are shown in the drawings, it should be understood that the present disclosure may be embodied in various forms, and these embodiments are provided for a thorough and complete understanding of the present disclosure. It should be understood that the drawings and embodiments of the present disclosure are only for exemplary purposes.

It should be understood that the various steps described in the method implementations of the present disclosure may be performed in different orders and/or in parallel. Furthermore, the method implementations may include additional steps and/or omit performing the illustrated steps.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units.

It should be noted that the modifications of "a," "an," "a plurality of," and the like mentioned in the present disclosure are illustrative, and those skilled in the art should understand that unless the context clearly indicates otherwise, these modifications should be understood as "one or more."

The names of messages or information interacted between multiple devices in the implementations of the present disclosure are only for illustrative purposes.

FIG. 1 is a flowchart of a data interaction method provided by an embodiment of the present disclosure. The method may be executed by a data interaction apparatus. Herein the apparatus may be implemented by software and/or hardware, and may be configured in an electronic device. Typically, the apparatus may be configured in a mobile phone or a tablet computer. The data interaction method provided by the embodiments of the present disclosure is applicable to a scene in which it is interacted for works sent by other users. As shown in FIG. 1, the data interaction method provided by the embodiment may include:

S101: displaying an object display window of a target work, where a publisher identification of the target work, a target control, and at least two objects are displayed in the object display window, the publisher identification is an identification of a target publisher, and the target publisher is a publisher of the target work.

In the embodiment, the target work may be a work that a user watches currently, such as a video, an article, or other multimedia contents. The target publisher is the publisher of the target work. The publisher identification is the identification of the target publisher, i.e., the identification of the publisher of the target work, such as a profile picture and/or a username of the publisher of the target work. The following is described by taking the publisher identification being the profile picture of the target publisher as an example. The object may be an object that the user may send to the target publisher, such as a virtual item. The target control may be a control that is configured to send the corresponding object to the target work, such as a rewarding control, a sending control, or a confirming control.

Figure 2:
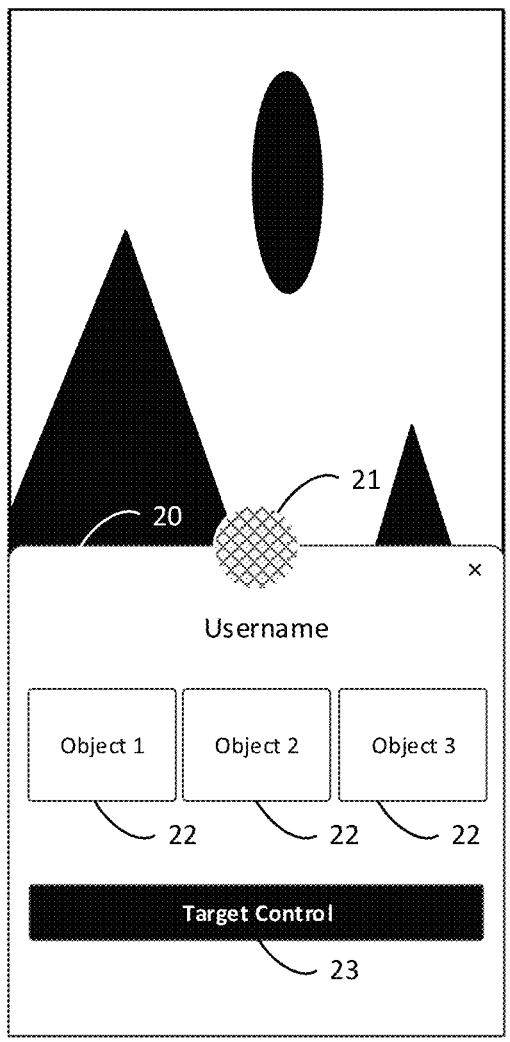
FIG. 2 is a schematic display diagram of an object display window provided by an embodiment of the present disclosure.

In an embodiment, the user may view the target work, and when the user intends to interact with the publisher of the target work by an object, the electronic device is instructed to display the object display window 20 of the target work through a corresponding triggering operation, such as a window display operation. Correspondingly, when the window display operation is received from the target user, the electronic device may display the object display window 20 of the target work, and display the publisher identification 21 of the target work, the target control 23, and at least two objects 22 that may be selected by the user in the object display window 20 as illustrated in FIG. 2. Herein, the at least two objects 22 may be different types of objects, such as different virtual items or different quantities of virtual items.

S102: receiving a triggering operation acting on the target control.

In the embodiment, the triggering operation may be an operation that triggers the target control, such as an operation of clicking on the target control.

Figure 3:
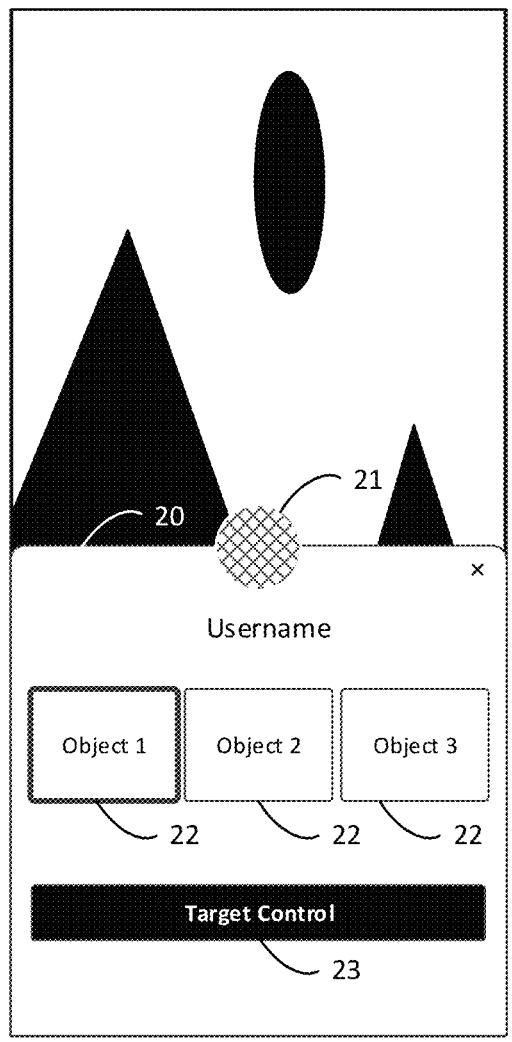
FIG. 3 is a schematic display diagram of another object display window provided by an embodiment of the present disclosure.

For example, the user may select the target object from a plurality of the objects 22 displayed in the object display window 20, and after selection, the target control 23 displayed in the object display window is triggered to interact with the publisher of the work by the target object. Correspondingly, when the electronic device detects that the user selects an object 22, the object 22 may be considered as the target object, the object 22 is displayed as a selected state as illustrated in FIG. 3 (an example that the user selects the leftmost object 22 is shown in the figure), and the operation of the user triggering the target control 23 is received.

S103: obtaining, in response to the triggering operation, a target object selected by a user in the object display window, and controlling the target object to move towards a first display position of the publisher identification.

In the embodiment, the target object may be an object selected by the user in the object display window. The first display position may be a display position within a display region in which the publisher identification is located. The first display position may be set by developers, or may be set by the publisher of the target work as needed to meet the needs of the publisher. For example, the first display position may be a position in which the profile picture of the target publisher is located or a position around the profile picture of the target publisher, for example, a lower side of the profile picture of the target publisher, so as to present the effect of the target object moving towards the target publisher, thus improving the interactive experience of the user.

For example, when the electronic device receives the triggering operation acting on the target control, that is, when the electronic device detects that the user triggers the target object displayed in the object display window, the target object may be controlled to move towards the publisher identification of the target publisher, and the target object may be distributed to the account of the target publisher. For example, the electronic device may send a request to a server and request the server to distribute the target object selected by the user to the account of the target publisher, for example, requesting the server to add a corresponding virtual item in the account of the target publisher.

S104: executing, after the target object is moved to the first display position, a feedback event of the target publisher.

In the embodiment, after the target object is controlled to move to the first display position, the feedback event of the target publisher may also be executed to express the gratitude of the target publisher to the user, thus enhancing the interaction between the user and the target publisher, and improving the interest and enthusiasm of the user during interaction, thereby improving the interactive experience of the user.

In the embodiment, the feedback event of the target publisher may be understood as an event that the target publisher provides feedback on the interaction of the user, such as displaying a feedback message of the target publisher, playing a feedback audio of the target publisher, and/or playing a feedback animation of the target publisher.

For example, the feedback message of the target publisher may be displayed, which may avoid interference in viewing of the target work (e.g., a video or the like) for the user. Optionally, executing the feedback event of the target publisher includes: displaying a first feedback message of the target publisher in a second display position of the publisher identification.

Here, the second display position may be a display position within the display region in which the publisher identification is located. The second display position may be set by the developers or set by the publisher of the target work as needed. For example, the second display position may be the position in which the profile picture of the target publisher is located or the position around the profile picture of the target publisher, for example, an upper right side of the profile picture of the target publisher. The first feedback message may be a feedback message of the target publisher, and the feedback message may be displayed in text form. The first feedback message may be set by the developers or the target publisher. For example, the first feedback message may be set by the target publisher, that is, the first feedback message may be a feedback message input or selected by the target publisher. For example, the target publisher may input or select the feedback message in a message management page as needed to meet the needs of the target publisher.

In the embodiment, when the objects selected by the user are different, the different feedback messages may be displayed, so as to improve the interest during the interaction of the user. Optionally, the first feedback message is a feedback message corresponding to the target object. Herein the different objects correspond to the different feedback messages.

Figure 4:
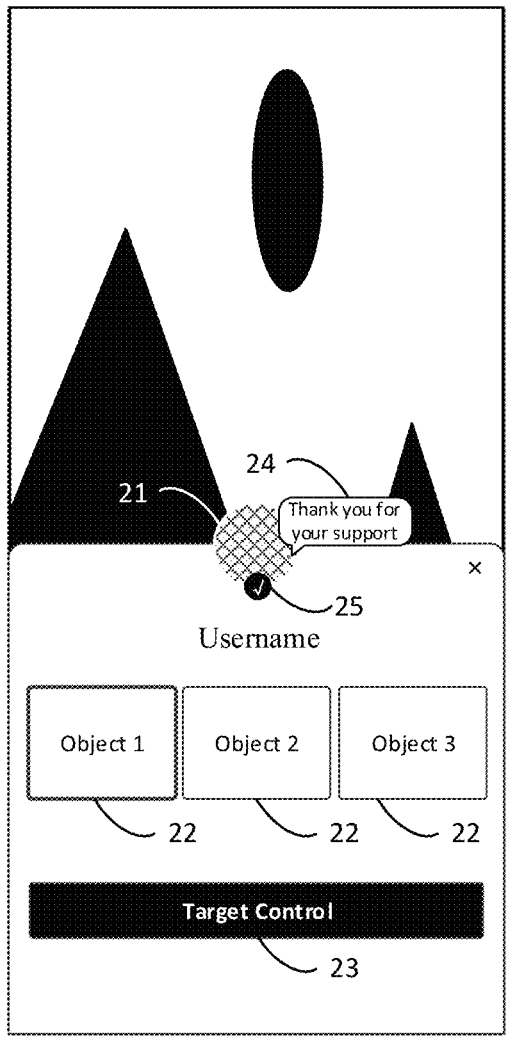
FIG. 4 is a schematic display diagram of still another object display window provided by an embodiment of the present disclosure.

For example, the target publisher may set the own feedback message in the message management page in advance and upload it to the server for storage. Thus, after the electronic device receives the triggering operation for the target work, it may acquire the feedback message set by the target publisher from the server, and display the feedback message after controlling the target object to move to the first display position, for example, displaying the feedback message 24, which corresponds to the target object and is set by the target publisher, in a display position (e.g., the upper right side of the publisher identification 21) of the publisher identification 21 of the target publisher as illustrated in FIG. 4.

In an implementation, the data interaction method provided by the embodiment may further include at least one of the following: displaying a message input region in a message management page, and using a feedback message input by the user in the message input region as a second feedback message of the user; or displaying at least one preset feedback message in the message management page, and using, when a selection operation for any one of the at least one preset feedback message is received, a preset feedback message corresponding to the selection operation as the second feedback message of the user.

In the above implementation, in addition to interacting with other users, the user may also set the own feedback message, so as to express the gratitude to the other users by this feedback message after the user interacts with the other users.

In the embodiment, the message management page may be a page for setting the feedback message. The message input region may be a region for the user to input the feedback message to be set by the user. The second feedback message may be a feedback message of the user. The preset feedback message may include a feedback message set by the developers and/or a feedback message previously input or used by the user.

Figure 5:
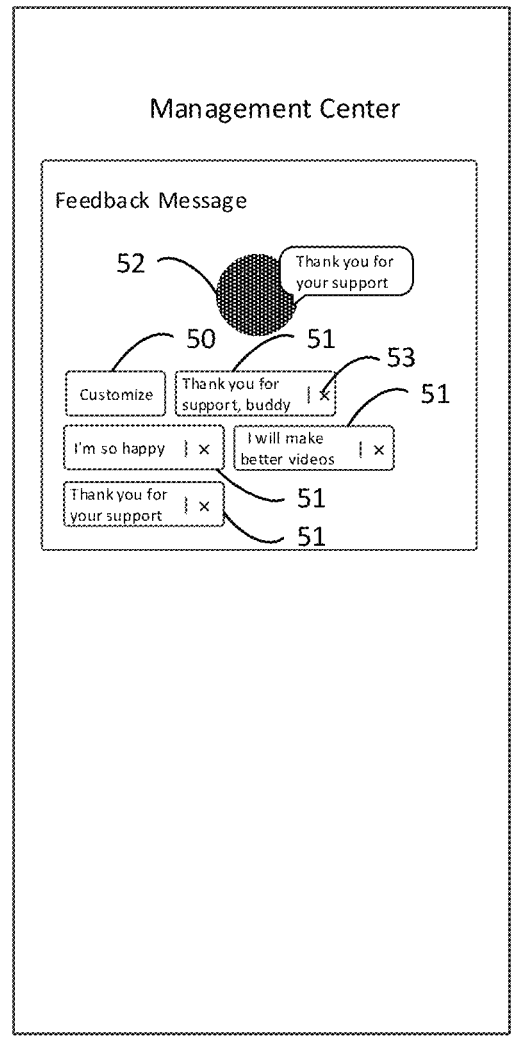
FIG. 5 is a schematic diagram of a message management page provided by an embodiment of the present disclosure.

For example, as illustrated in FIG. 5, the message management page may display a custom control 50 and a plurality of preset feedback messages 51. Thus, the user may trigger the custom control 50 to instruct the electronic device to display the message input region, and input the feedback message to be set by the user in the message input region. Correspondingly, when the electronic device detects that the user triggers the custom control 50 in the message management page, it may display the message input region. For example, the display region of the custom control is displayed as the message input region, or the message input region is displayed in other positions of the message management page. After the user completes the input, the message input by the user in the message input region is acquired as the feedback message of the user. Alternatively, the user may directly select a preset feedback message 51 as the own feedback message; and correspondingly, the electronic device may use the preset feedback message 51 selected by the user as the feedback message of the user when it is detected that the user selects the preset feedback message 51 displayed in the message management page.

In addition, further referring to FIG. 5, the message management page may also display a preview image with the feedback message. For example, the message management page may also display a profile picture 52 of the user. After the user inputs the feedback message or selects the preset feedback message 51, the feedback message may be displayed in a preset display position of the profile picture 52 for the user to preview the display effect of the feedback message. Each preset feedback message 51 may also be set with a deletion control 53 correspondingly, so that the user may instruct the electronic device to delete the preset feedback message 51 by the deletion control 53 corresponding to the preset feedback message 51.

In the embodiment, after the target object is moved to the first display position, a prompt message may also be displayed, and the user is prompted for successful interaction by the prompt message. Optionally, executing, after the target object is moved to the first display position, the feedback event of the target publisher includes: after the target object is moved to the first display position, stopping displaying the target object in the first display position, and displaying prompt information; and in response to a display duration of the prompt information reaching a setting duration, executing the feedback event of the target publisher.

In the embodiment, the setting duration may be set by the developers as needed. For example, the setting duration may be with a time length of 1 second, 2 seconds, or the like.

For example, when the electronic device receives the triggering operation acting on the target control 23, it controls the target object to move towards the first display position of the publisher identification 21. After the target object moves to the first display position, displaying the target object in the first display position is stopped, and the prompt information 25 is displayed, such as the prompt information 25 is displayed in the first display position. After the prompt information 25 is displayed for the setting duration, the feedback message 24 of the target publisher is displayed in the second display position of the publisher identification as illustrated in FIG. 4. In addition, after the display duration of the prompt information 25 reaches the preset time length greater than or equal to the above setting duration, the electronic device may also stop displaying the prompt information 25. After the feedback message 24 of the target publisher has been displayed for the preset time length, displaying the feedback message 24 may also be stopped, so as to avoid the interference in further interaction or viewing of contents of the target work or the object display window for the user.

The data interaction method provided by the embodiment includes: displaying an object display window of a target work, where a publisher identification of the target work, a target control, and at least two objects are displayed in the object display window, the publisher identification is an identification of a target publisher, and the target publisher is a publisher of the target work; receiving a triggering operation acting on the target control; obtaining, in response to the triggering operation, a target object selected by a user in the object display window, and controlling the target object to move towards a first display position of the publisher identification; and executing, after the target object is moved to the first display position, a feedback event of the target publisher. In the embodiment, when the user interacts with the publisher, the target object selected by the user is controlled to move towards the publisher identification, and when the target object moves to the position of the publisher identification, the feedback event of the publisher is executed. Thus, it can create a visual effect of sending the target object selected by the user to the publisher, and also express the gratitude of the publisher to the user, thereby enhancing the interaction between the user and the publisher, improving the interest during interaction of the user, and improving the interactive experience of the user.

Figure 6:
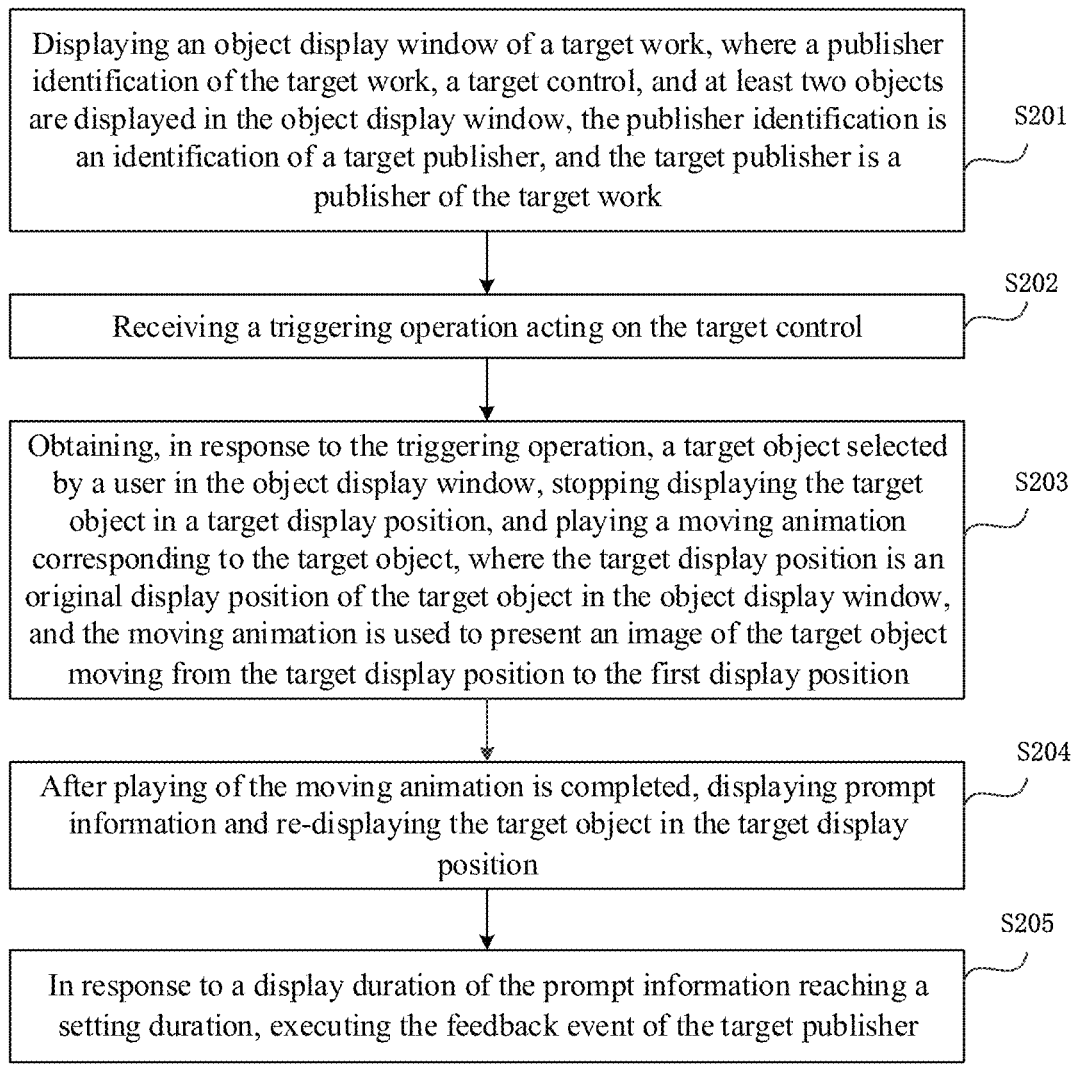
FIG. 6 is a flowchart of another data interaction method provided by an embodiment of the present disclosure.

FIG. 6 is a flowchart of another data interaction method provided by an embodiment of the present disclosure. The solution in the embodiment may be combined with one or more optional solutions in the above embodiments. Optionally, controlling the target object to move towards the first display position of the publisher identification includes: stopping displaying the target object in a target display position, and playing a moving animation corresponding to the target object, where the target display position is an original display position of the target object in the object display window, and the moving animation is used to present an image of the target object moving from the target display position to the first display position; and executing, after the target object is moved to the first display position, the feedback event of the target publisher includes: executing, after playing of the moving animation is completed, the feedback event of the target publisher.

Optionally, the data interaction method provided by the embodiment may also include: re-displaying, after playing of the moving animation is completed, the target object in the target display position.

Correspondingly, as shown in FIG. 6, the data interaction method provided by the embodiment may include:

S201: displaying an object display window of a target work, where a publisher identification of the target work, a target control, and at least two objects are displayed in the object display window, the publisher identification is an identification of a target publisher, and the target publisher is a publisher of the target work.

S202: receiving a triggering operation acting on the target control.

S203: obtaining, in response to the triggering operation, a target object selected by a user in the object display window, stopping displaying the target object in a target display position, and playing a moving animation corresponding to the target object, where the target display position is an original display position of the target object in the object display window, and the moving animation is used to present an image of the target object moving from the target display position to the first display position.

In the embodiment, the target display position may be understood as the original display position of the target object in the object display window, that is, the display position in which the target object is located before the triggering operation acting on the target control is received. The moving animation corresponding to the object (including the target object) may be an animation used to present an image that the object moves from its original display position to the first display position of the publisher identification, different objects may have different moving animations, and the moving animation corresponding to the object may be set by the developers in advance.

In the embodiment, the image that the target object moves towards the first display position of the publisher identification may be presented by the preset moving animation, that is, in the moving animation, the target object moves towards the first display position of the publisher identification. Thus, in the case that the visual effect of the target object moving towards the publisher identification is ensured to be presented to the user, the operation required for presenting the visual effect can also be simplified.

For example, after the user selects and determines the target object, the target control 23 in the object display window 20 may be triggered as illustrated in FIG. 3. Correspondingly, when the electronic device detects that the user triggers the target control 23, it may stop displaying the target object in the target display position of the object display window 20 and play the moving animation that the target object moves from the target display position to the first display position of the publisher identification 21, so as to present the user with the visual effect of the target object moving towards the publisher identification 21.

S204: after playing of the moving animation is completed, displaying prompt information and re-displaying the target object in the target display position.

In the embodiment, in response to detecting that the user triggers the target control, the object display window is not closed, but the target object is controlled to move towards the first display position of the publisher identification, and after the target object moves to the first display position, the target object is re-displayed in the target display position of the object display window. Therefore, the user may directly interact with the target publisher again through the object display window without the need to execute the triggering operation instructing the electronic device to display the object display window again, which can simplify the operation required for the user to perform secondary interaction, thus improving the user experience.

For example, after playing of the moving animation corresponding to the target object is completed, that is, after the target object moves to the first display position of the publisher identification 21 in the moving animation, display of the moving animation may be stopped, the prompt information 25 is displayed in the first display position, and the target object is re-displayed in the target display position as illustrated in FIG. 4.

In the embodiment, when the target object is re-displayed in the target display position, the target object may be displayed as a selected state or an unselected state. For example, the target object may be displayed as the selected state, so that the user can directly trigger the target control to interact with the target publisher again by the target object, and thus the operation required for the user to perform the secondary interaction is simplified.

S205: in response to a display duration of the prompt information reaching a setting duration, executing the feedback event of the target publisher.

The data interaction method provided by the embodiment may not only increase the interaction between the user and the publisher, but also improve the interest during interaction of the user. Furthermore, it can also simplify the operation that the electronic device needs to perform during the user interaction, and improve the response speed of the electronic device, thereby improving the user experience.

Figure 7:
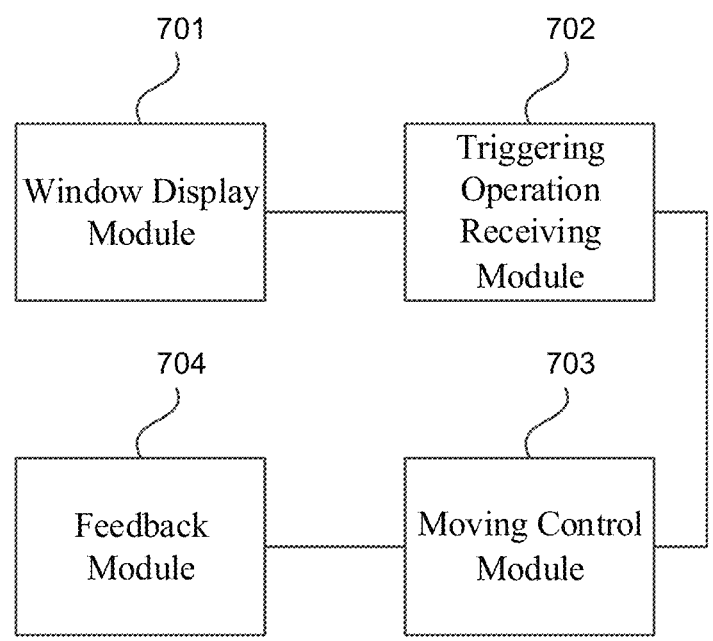
FIG. 7 is a structural block diagram of a data interaction apparatus provided by an embodiment of the present disclosure.

FIG. 7 is a structural block diagram of a data interaction apparatus provided by an embodiment of the present disclosure. The apparatus may be implemented by software and/or hardware, and may be configured in the electronic device. For example, it may be configured in a mobile phone or a tablet computer, and may achieve the interaction between different users by executing the data interaction method. As illustrated in FIG. 7, the data interaction apparatus provided by the embodiment may include: a window display module 701, a triggering operation receiving module 702, a moving control module 703, and a feedback module 704.

The window display module 701 is configured to display an object display window of a target work. Herein, a publisher identification of the target work, a target control, and at least two objects are displayed in the object display window, the publisher identification is an identification of a target publisher, and the target publisher is a publisher of the target work.

The triggering operation receiving module 702 is configured to receive a triggering operation acting on the target control.

The moving control module 703 is configured to, in response to the triggering operation, obtain a target object selected by a user in the object display window, and control the target object to move towards a first display position of the publisher identification.

The feedback module 704 is configured to, after the target object is moved to the first display position, execute a feedback event of the target publisher.

For the data interaction apparatus provided by the embodiment, the window display module is used to display an object display window of a target work, where a publisher identification of the target work, a target control, and at least two objects are displayed in the object display window, the publisher identification is an identification of a target publisher, and the target publisher is a publisher of the target work; the triggering operation receiving module is used to receive a triggering operation acting on the target control; the moving control module is used to, in response to the triggering operation, obtain a target object selected by a user in the object display window, and control the target object to move towards a first display position of the publisher identification; and the feedback module is used to, after the target object is moved to the first display position, execute a feedback event of the target publisher. In the embodiment, when the user interacts with the publisher, the target object selected by the user is controlled to move towards the publisher identification, and when the target object moves to the position of the publisher identification, the feedback event of the publisher is executed. Thus, it can create a visual effect of sending the target object selected by the user to the publisher, and also express the gratitude of the publisher to the user, thereby enhancing the interaction between the user and the publisher, improving the interest during interaction of the user, and improving the interactive experience of the user.

In the above technical solution, the feedback module 704 may include: a prompt unit, configured to, after the target object is moved to the first display position, stop displaying the target object in the first display position and display prompt information; and a feedback unit, configured to, in response to a display duration of the prompt information reaching a setting duration, execute the feedback event of the target publisher.

In the above technical solution, the feedback module 704 may further be configured to: display a first feedback message of the target publisher in a second display position of the publisher identification.

In the above technical solution, the first feedback message may be a feedback message corresponding to the target object, and different objects may correspond to different feedback messages.

In the above technical solution, the first feedback message may be a feedback message which is input by the target publisher or selected by the target publisher.

Optionally, the data interaction apparatus provided by the embodiment may further include at least one of the following: a message input module, configured to display a message input region in a message management page, and use a feedback message input by the user in the message input region as a second feedback message of the user; or a message selecting module, configured to display at least one preset feedback message in the message management page, and use, when a selection operation for any one of the at least one preset feedback message is received, a preset feedback message corresponding to the selection operation as the second feedback message of the user.

In the above technical solution, the moving control module 703 may further be configured to: stop displaying the target object in a target display position, and play a moving animation corresponding to the target object, where the target display position is an original display position of the target object in the object display window, and the moving animation is used to present an image of the target object moving from the target display position to the first display position; and the feedback module 704 may further be configured to: execute, after playing of the moving animation is completed, the feedback event of the target publisher.

In the above technical solution, the feedback module 704 may further be configured to: re-display, after playing of the moving animation is completed, the target object in the target display position.

The data interaction apparatus provided by the embodiments of the present disclosure may execute the data interaction method provided by any one of the embodiments of the present disclosure, and can have corresponding functional modules and beneficial effects for executing the data interaction method. Technical details that are not fully described in the embodiment may refer to those in the data interaction method provided by any one of the embodiments of the present disclosure.

In the following, referring to FIG. 8, a schematic structural diagram of an electronic device (e.g., a terminal device) 800 suitable for implementing the embodiments of the present disclosure is illustrated. For example, the terminal device in the embodiments of the present disclosure may include mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. It should be noted that the electronic device shown in FIG. 8 is merely an example.

Figure 8:
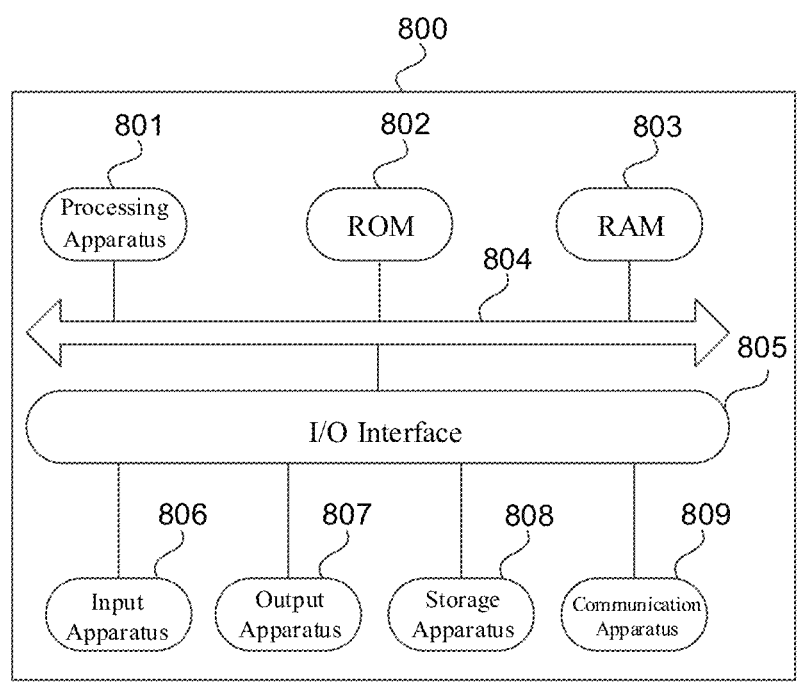
FIG. 8 is a schematic structural diagram of an electronic device provided by an embodiment of the present disclosure.

As illustrated in FIG. 8, the electronic device 800 may include a processing apparatus 801 (e.g., a central processing unit, a graphics processing unit, etc.). The electronic device 800 may execute various appropriate actions and processing according to a program stored on a read-only memory (ROM) 802 or a program loaded from a storage apparatus 808 into a random access memory (RAM) 803. The RAM 803 further stores various programs and data required for operation of the electronic device 800. The processing apparatus 801, the ROM 802, and the RAM 803 are connected with each other through a bus 804. An input/output (I/O) interface 805 is also connected to the bus 804.

Usually, apparatuses below may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a speaker, a vibrator, or the like; a storage apparatus 808 including, for example, a magnetic tape, a hard disk, or the like; and a communication apparatus 809. The communication apparatus 809 may allow the electronic device 800 to perform wireless or wired communication with other electronic devices so as to exchange data. Although FIG. 8 shows the electronic device 800 having various apparatuses, it should be understood that, it is not required to implement or have all the apparatuses illustrated, and the electronic device may alternatively implement or have more or fewer apparatuses.

Specifically, according to the embodiments of the present disclosure, the process described above with reference to the flowchart may be implemented as computer software programs. For example, the embodiments of the present disclosure include a computer program product, including a computer program carried on a non-transitory computer-readable medium, and the computer program includes program codes for executing the method shown in the flowchart. In such embodiments, the computer program may be downloaded and installed from the network via the communication apparatus 809, or installed from the storage apparatus 808, or installed from the ROM 802. When executed by the processing apparatus 801, the computer program may implement the above functions defined in the method provided by the embodiments of the present disclosure.

It should be noted that, in the context of the present disclosure, the computer-readable medium may be a computer-readable signal medium or a computer-readable storage medium, or any combination thereof. For example, the computer-readable storage medium may be an electric, magnetic, optical, electromagnetic, infrared, or semiconductor system, apparatus or device, or any combination thereof. The computer-readable storage medium may include: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including an electric wire, a fiber-optic cable, radio frequency (RF) and the like, or any appropriate combination of them.

In some implementations, the client terminal and the server may communicate with any network protocol currently known or to be researched and developed in the future such as hypertext transfer protocol (HTTP), and may communicate (for example, via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to: display an object display window of a target work, where a publisher identification of the target work, a target control, and at least two objects are displayed in the object display window, the publisher identification is an identification of a target publisher, and the target publisher is a publisher of the target work; receive a triggering operation acting on the target control; obtain, in response to the triggering operation, a target object selected by a user in the object display window, and control the target object to move towards a first display position of the publisher identification; and execute, after the target object is moved to the first display position, a feedback event of the target publisher.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware.

The functions described herein above may be performed, at least partially, by one or more hardware logic components. For example, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. More specific examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

According to one or more embodiments of the present disclosure, Example 1 provides a data interaction method, comprising:
  displaying an object display window of a target work, wherein a publisher identification of the target work, a target control, and at least two objects are displayed in the object display window, the publisher identification is an identification of a target publisher, and the target publisher is a publisher of the target work;
  receiving a triggering operation acting on the target control;
  obtaining, in response to the triggering operation, a target object selected by a user in the object display window, and controlling the target object to move towards a first display position of the publisher identification; and
  executing, after the target object is moved to the first display position, a feedback event of the target publisher.

According to one or more embodiments of the present disclosure, in the method of Example 2 according to Example 1, executing, after the target object is moved to the first display position, the feedback event of the target publisher comprises:
  after the target object is moved to the first display position, stopping displaying the target object in the first display position, and displaying prompt information; and
  in response to a display duration of the prompt information reaching a setting duration, executing the feedback event of the target publisher.

According to one or more embodiments of the present disclosure, in the method of Example 3 according to Example 1, executing the feedback event of the target publisher comprises:
  displaying a first feedback message of the target publisher in a second display position of the publisher identification.

According to one or more embodiments of the present disclosure, in the method of Example 4 according to Example 3, the first feedback message is a feedback message corresponding to the target object, and different objects correspond to different feedback messages.

According to one or more embodiments of the present disclosure, in the method of Example 5 according to Example 3, the first feedback message is a feedback message which is input by the target publisher or selected by the target publisher.

According to one or more embodiments of the present disclosure, the method of Example 6 according to Example 5 further comprises at least one of:
  displaying a message input region in a message management page, and using a feedback message input by the user in the message input region as a second feedback message of the user; or
  displaying at least one preset feedback message in the message management page, and using, when a selection operation for any one of the at least one preset feedback message is received, a preset feedback message corresponding to the selection operation as the second feedback message of the user.

According to one or more embodiments of the present disclosure, in the method of Example 7 according to Example 1, controlling the target object to move towards the first display position of the publisher identification comprises:
  stopping displaying the target object in a target display position, and playing a moving animation corresponding to the target object, wherein the target display position is an original display position of the target object in the object display window, and the moving animation is used to present an image of the target object moving from the target display position to the first display position; and
  executing, after the target object is moved to the first display position, the feedback event of the target publisher comprises:
  executing, after playing of the moving animation is completed, the feedback event of the target publisher.

According to one or more embodiments of the present disclosure, the method of Example 8 according to Example 7 further comprises:
  re-displaying, after playing of the moving animation is completed, the target object in the target display position.

According to one or more embodiments of the present disclosure, Example 9 provides a data interaction apparatus, comprising:

a window display module, configured to display an object display window of a target work, wherein a publisher identification of the target work, a target control, and at least two objects are displayed in the object display window, the publisher identification is an identification of a target publisher, and the target publisher is a publisher of the target work;

a triggering operation receiving module, configured to receive a triggering operation acting on the target control;

a moving control module, configured to, in response to the triggering operation, obtain a target object selected by a user in the object display window, and control the target object to move towards a first display position of the publisher identification; and a feedback module, configured to, after the target object is moved to the first display position, execute a feedback event of the target publisher.

According to one or more embodiments of the present disclosure, Example 10 provides an electronic device, comprising:
one or more processors; and
a memory, used to store one or more programs,
wherein the one or more programs, when executed by the one or more processors, cause the one or more processors to implement the data interaction method according to any one of Examples 1 to 8.

According to one or more embodiments of the present disclosure, Example 11 provides a computer-readable storage medium, wherein a computer program is stored on the storage medium, and the computer program, when executed by a processor, causes the processor to implement the data interaction method according to any one of Examples 1 to 8.

According to one or more embodiments of the present disclosure, Example 12 provides a computer program product, wherein the computer program product, when executed by a computer, causes the computer to implement the data interaction method according to any one of Examples 1 to 8.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. A data interaction method, comprising:
displaying an object display window of a target work;
displaying an identification of a target publisher, a target control, and a plurality of objects in the object display window, wherein the target publisher is a publisher of the target work, the plurality of objects are selectable by a user, and the target control is configured to trigger an interaction between the target publisher and a target object among the plurality of objects displayed in the object display window;
receiving a triggering operation acting on the target control;
obtaining, in response to the triggering operation, the target object selected by the user among the plurality of objects displayed in the object display window;
controlling the target object to move towards the identification of the target publisher in response to receiving the triggering operation on the target control; and
in response to the target object reaching a first display position proximate to the identification of the target publisher, stopping displaying the target object at the first display position and executing a feedback event of the target publisher wherein the feedback event of the target publisher corresponds to the target object selected by the user, and wherein the feedback event of the target publisher is among a plurality of feedback events of the target publisher corresponding to the plurality of objects, respectively.

2. The method according to claim 1, further comprising:
in response to the target object reaching the first display position, displaying prompt information; and
in response to a display duration of the prompt information reaching a setting duration, executing the feedback event of the target publisher.

3. The method according to claim 1, wherein the executing the feedback event of the target publisher comprises:
displaying a first feedback message of the target publisher in a second display position of the publisher identification.

4. The method according to claim 3, wherein the first feedback message is a feedback message corresponding to the target object, and different objects correspond to different feedback messages.

5. The method according to claim 3, wherein the first feedback message is a feedback message which is input by the target publisher or selected by the target publisher.

6. The method according to claim 5, further comprising at least one of:
displaying a message input region in a message management page, and using a feedback message input by the user in the message input region as a second feedback message of the user; or
displaying at least one preset feedback message in the message management page, and using, when a selection operation for any one of the at least one preset feedback message is received, a preset feedback message corresponding to the selection operation as the second feedback message of the user.

7. The method according to claim 1,
wherein the controlling the target object to move towards identification of the target publisher comprises:
stopping displaying the target object in a target display position, and playing a moving animation corresponding to the target object, wherein the target display position is an original display position of the target object in the object display window, and the moving animation is used to present an image of the target object moving from the target display position to the identification of the target publisher; and
wherein the executing the feedback event of the target publisher comprises:
executing, after playing of the moving animation is completed, the feedback event of the target publisher.

8. The method according to claim 7, further comprising:
re-displaying, after playing of the moving animation is completed, the target object in the target display position.

9. An electronic device, comprising:
a processor; and
a memory configured to store a program,
wherein the program, when executed by the processor, causes the processor to implement operations comprising:
displaying an object display window of a target work;
displaying an identification of a target publisher, a target control, and a plurality of objects in the object display window, wherein the target publisher is a publisher of the target work, the plurality of objects are selectable by a user, and the target control is configured to trigger an interaction between the target publisher and a target object among the plurality of objects displayed in the object display window;
receiving a triggering operation acting on the target control;
obtaining, in response to the triggering operation, the target object selected by the user among the plurality of objects displayed in the object display window;
controlling the target object to move towards the identification of the target publisher in response to receiving the triggering operation on the target control; and
in response to the target object reaching a first display position proximate to the identification of the target publisher, stopping displaying the target object at the first display position and executing a feedback event of the target publisher, wherein the feedback event of the target publisher corresponds to the target object selected by the user, and wherein the feedback event of the target publisher is among a plurality of feedback events of the target publisher corresponding to the plurality of objects, respectively.

10. The electronic device according to claim 9, wherein the executing the feedback event of the target publisher comprises:
in response to the target object reaching the first display position, displaying prompt information; and
in response to a display duration of the prompt information reaching a setting duration, executing the feedback event of the target publisher.

11. The electronic device according to claim 9, wherein the executing the feedback event of the target publisher comprises:
displaying a first feedback message of the target publisher in a second display position of the publisher identification.

12. The electronic device according to claim 9, wherein the controlling the target object to move towards the identification of the target publisher comprises:
stopping displaying the target object in a target display position, and playing a moving animation corresponding to the target object, wherein the target display position is an original display position of the target object in the object display window, and the moving animation is used to present an image of the target object moving from the target display position to the identification of the target publisher; and
wherein the executing the feedback event of the target publisher comprises:
executing, after playing of the moving animation is completed, the feedback event of the target publisher.

13. A non-transitory computer-readable storage medium, wherein a computer program is stored on the storage medium, and the computer program, when executed by a processor, causes the processor to:
display an object display window of a target work;
display an identification of a target publisher, a target control, and a plurality of objects in the object display window, wherein the target publisher is a publisher of the target work, the plurality of objects are selectable by a user, and the target control is configured to trigger an interaction between the target publisher and a target object among the plurality of objects displayed in the object display window;
receive a triggering operation acting on the target control;
obtain, in response to the triggering operation, the target object selected by the user among the plurality of objects displayed in the object display window;
control the target object to move towards the identification of the target publisher in response to receiving the triggering operation on the target control; and
in response to the target object reaching a first display position proximate to the identification of the target publisher, stop displaying the target object at the first display position and execute a feedback event of the target publisher, wherein the feedback event of the target publisher corresponds to the target object selected by the user, and wherein the feedback event of the target publisher is among a plurality of feedback events of the target publisher corresponding to the plurality of objects, respectively.

14. The non-transitory computer-readable storage medium according to claim 13, wherein executing the feedback event of the target publisher comprises:
in response to the target object reaching the first display position, displaying prompt information; and
in response to a display duration of the prompt information reaching a setting duration, executing the feedback event of the target publisher.

15. The non-transitory computer-readable storage medium according to claim 13, wherein executing the feedback event of the target publisher comprises:
displaying a first feedback message of the target publisher in a second display position of the publisher identification.

16. The non-transitory computer-readable storage medium according to claim 13, wherein controlling the target object to move towards the identification of the target publisher comprises:
stopping displaying the target object in a target display position, and playing a moving animation corresponding to the target object, wherein the target display position is an original display position of the target object in the object display window, and the moving animation is used to present an image of the target object moving from the target display position to the identification of the target publisher; and wherein executing the feedback event of the target publisher comprises:

executing, after playing of the moving animation is completed, the feedback event of the target publisher.

17. A computer program product, wherein the computer program product, when executed by a computer, causes the computer to implement the data interaction method according to claim 1.

\* \* \* \* \*